Patented Aug. 23, 1949

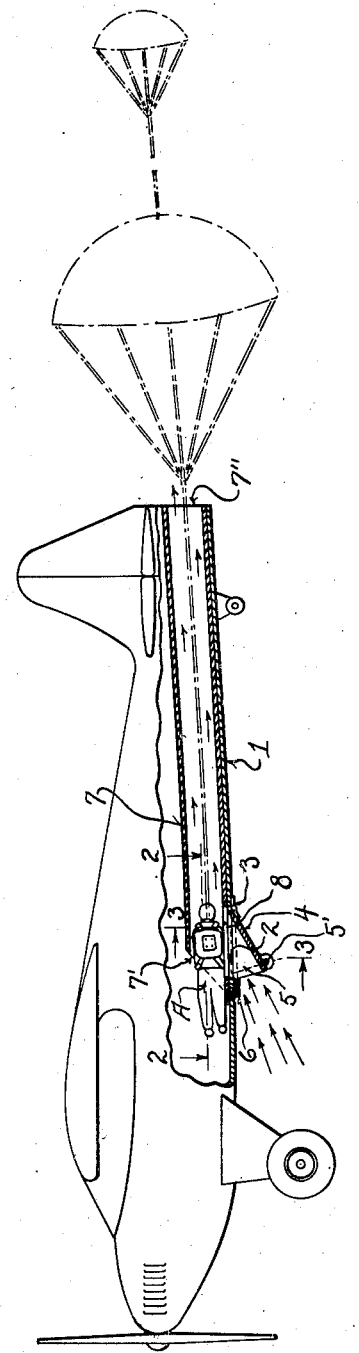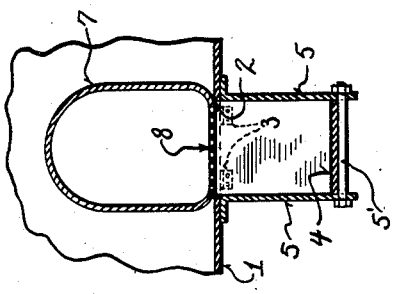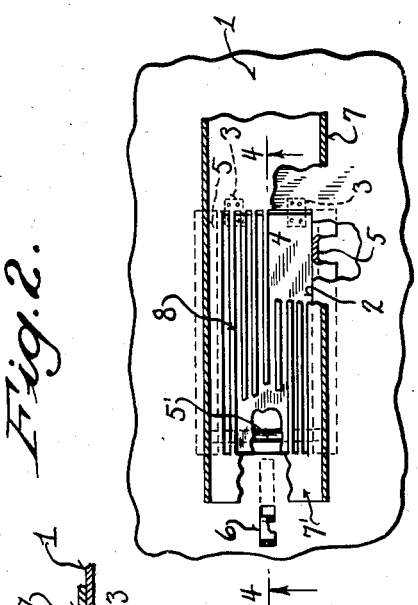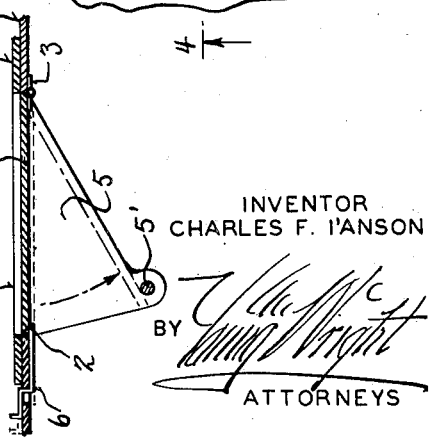
INVENTOR
CHARLES F. I'ANSON

2,479,746

UNITED STATES PATENT OFFICE 2,479,746

FORCED DRAFT PARACHUTE EQUIPPED PASSENGER ESCAPE FOR AIRPLANES

Charles F. I'Anson, Salem, Ill.

Application March 6, 1947, Serial No. 732,819

1 Claim. (Cl. 244—137)

My invention refers to airplanes and it has for its primary object to provide a longitudinally disposed open ended housing having a launching mouth at the tail end of the fuselage, the loading mouth of the housing being provided with a grating or grill and a controlled air intake door associated with an opening in the bottom of the fuselage which is provided with a suitable grating or grill, whereby in an emergency a flyer, passenger or package equipped with a standard parachute may enter the receiving housing mouth over the grill and by simply releasing the door, an air blast through the opening and grill will enter the housing and due to the draft therein, cause the flyer, passenger or other body carrying a parachute to be discharged through the housing at the tail end of a fuselage, whereby the body will be rendered free of all entanglement with the equipment.

A further object of my invention is to provide the door for controlling the opening of the fuselage with side wings whereby the air is collected and discharged into the housing or funnel, it being apparent that the wings may be fixed with reference to the door or independent thereof, by attaching the said side wings to the fuselage bottom wall.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 represents a side elevation of an airplane embodying the features of my invention, parts being broken away and in section to more clearly illustrate details of construction.

Figure 2 is an enlarged plan sectional view illustrating the intake mouth portion of a housing and grilled opening in the fuselage the section being indicated by line 2—2 of Figure 1.

Figure 3 is a cross section of the same, the section being indicated by line 3—3 of Figure 1.

Figure 4 is a longitudinal sectional elevation illustrating the air intake door and associated parts, the section being indicated by line 4—4 of Figure 2.

Referring by characters to the drawings, 1 indicates the bottom wall of an airplane fuselage having an opening 2 therein at a point intermediate the ends of said fuselage.

Secured to the rear end of the opening 2, by hinges 3, is a swinging door 4, the free end of which is directed towards the front portion of the fuselage.

As best indicated in Figures 1 and 4 of the drawings, the door 4, when in its open position, is inclined forwardly and its longitudinal edges are encased in a pair of side wings 5—5 which are suitably secured to the fuselage bottom wall. The side wings, for bracing purposes, are provided with a connected cross-rod 5', which rod also serves to limit the downward or opening movement of the door whereby a V-shaped mouth is developed and directed towards the front of the fuselage to form a scoop or chute through which a current of air is directed.

When the door 4 is swung inwardly to close the air intake opening 2, it is locked in said closed position by a suitable sliding bolt 6, as best indicated in Figures 2 and 4 of the drawings.

It will also be noted that the longitudinally disposed wings offer no wind resistance when the door 4 is closed. When said door is open, the assemblage forms a closed scoop to collect a proper air draft through the housing.

Suitably mounted upon the bottom wall of the fuselage is a longitudinally disposed open ended housing 7. The receiving mouth 7' of the housing is positioned over a grill or grating 8 covering the opening in the fuselage bottom, it being understood that the discharge mouth 7" of said housing communicates with the atmosphere at the tail end of the fuselage.

While I have illustrated one exemplification of my invention, it is understood that structural features may be varied within the knowledge of the skilled engineer.

From the foregoing description it is obvious, when it is desired to launch an individual, as indicated by the character A, in Figure 1, the said individual, being provided with a standard parachute pack, enters the mouth 7' of the housing over or rearwardly of the grill shielded fuselage opening 2, in this position the parachute is released and the door 4 is manually operated to drop downwardly and expose the fuselage opening. Immediately thereafter, as indicated by the arrows of Figure 1, an air blast is directed through the funnel whereby the parachute and body attached thereto will be caused to travel through the housing and be launched free from the tail end of the fuselage incidental to automatically opening the parachute, as indicated in dotted lines of Figure 1.

Thus a flyer or passenger, who may be a novice in the art of airplane travel, will automatically be launched in a safe manner and an indefinite number of passengers may be speedily discharged one by one through the housing.

I claim:

In an airplane launching device having a longitudinally disposed open ended housing fitted to the floor of the fuselage having an intake mouth in its front end and a discharge mouth in the tail end of said fuselage, adapted to receive individuals; the combination of a grill covered opening in the floor of the fuselage at the intake mouth of the housing, a V-shaped pair of wings depending from the sides of the grill covered opening, a cross rod connecting the bottom ends of the wings, a gravity controlled door pivoted to the rear end of the grill covered opening between the wings for opening and closing the said grill covered opening, and a cross rod connecting the bottom outer ends of the wings forming a brace therefor and stop for the door, whereby a funnel is developed when the door is open, and when the same is closed, the wings offer no wind resistance.

CHARLES F. I'ANSON.

REFERENCES CITED

The following references are of record in the file of this patent:

UNITED STATES PATENTS

| Number | Name | Date |
|---|---|---|
| 1,300,160 | Glover | Apr. 8, 1919 |
| 1,923,963 | Ayad | Aug. 22, 1933 |
| 2,120,477 | Adams | June 14, 1938 |
| 2,404,195 | Schlieben | July 16, 1946 |